Aug. 26, 1941.  C. J. CRANE ET AL  2,253,508
NAVIGATION SYSTEM FOR GUIDING AIRCRAFT
Filed Dec. 2, 1940  3 Sheets-Sheet 1
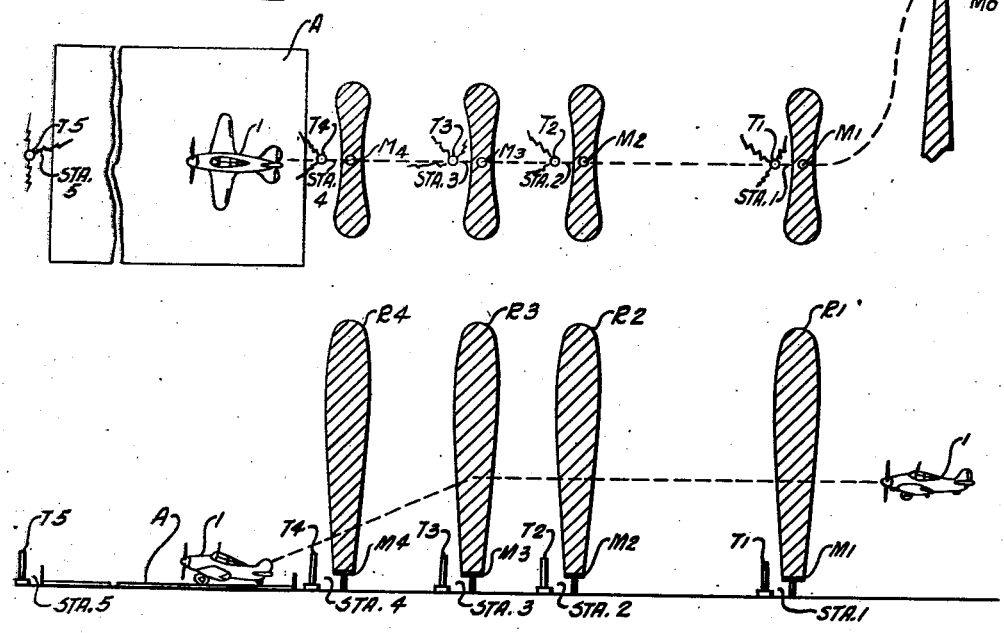
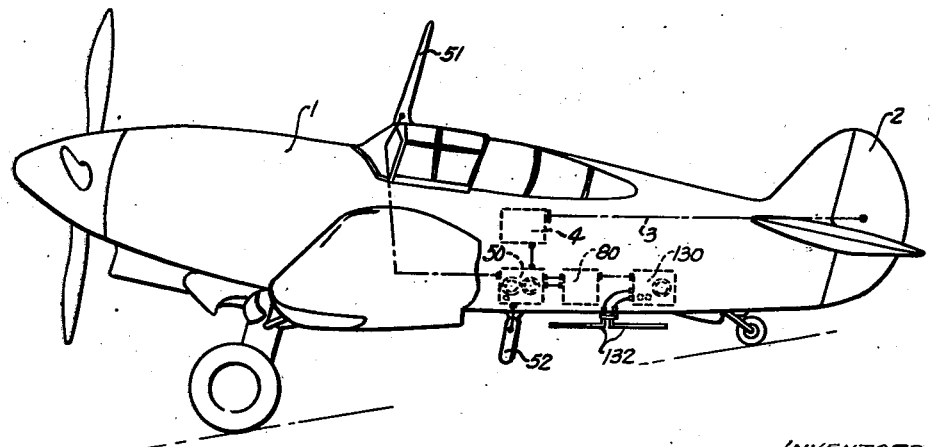
INVENTORS
CARL J. CRANE
CONSTANTIN D. BARBULESCO

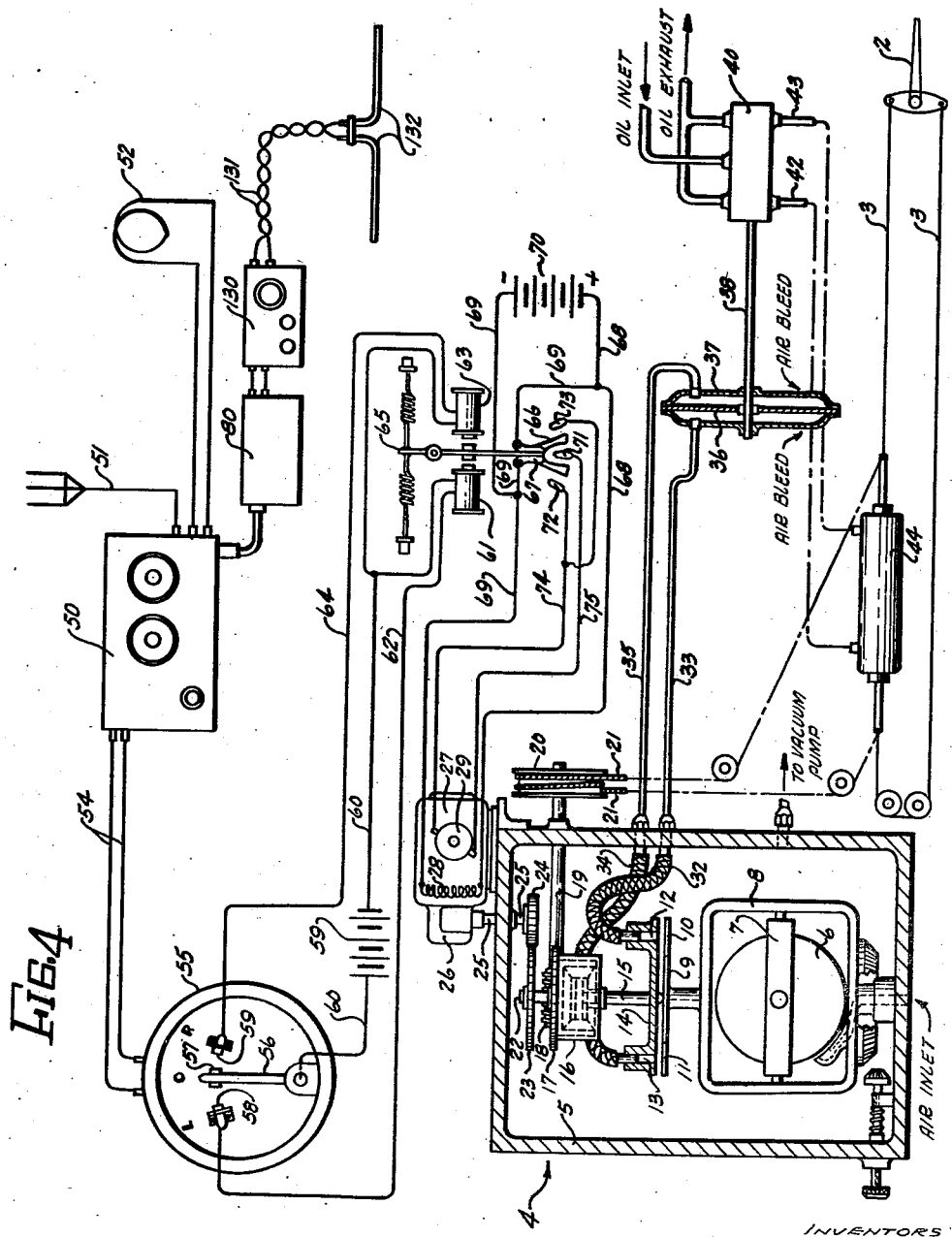

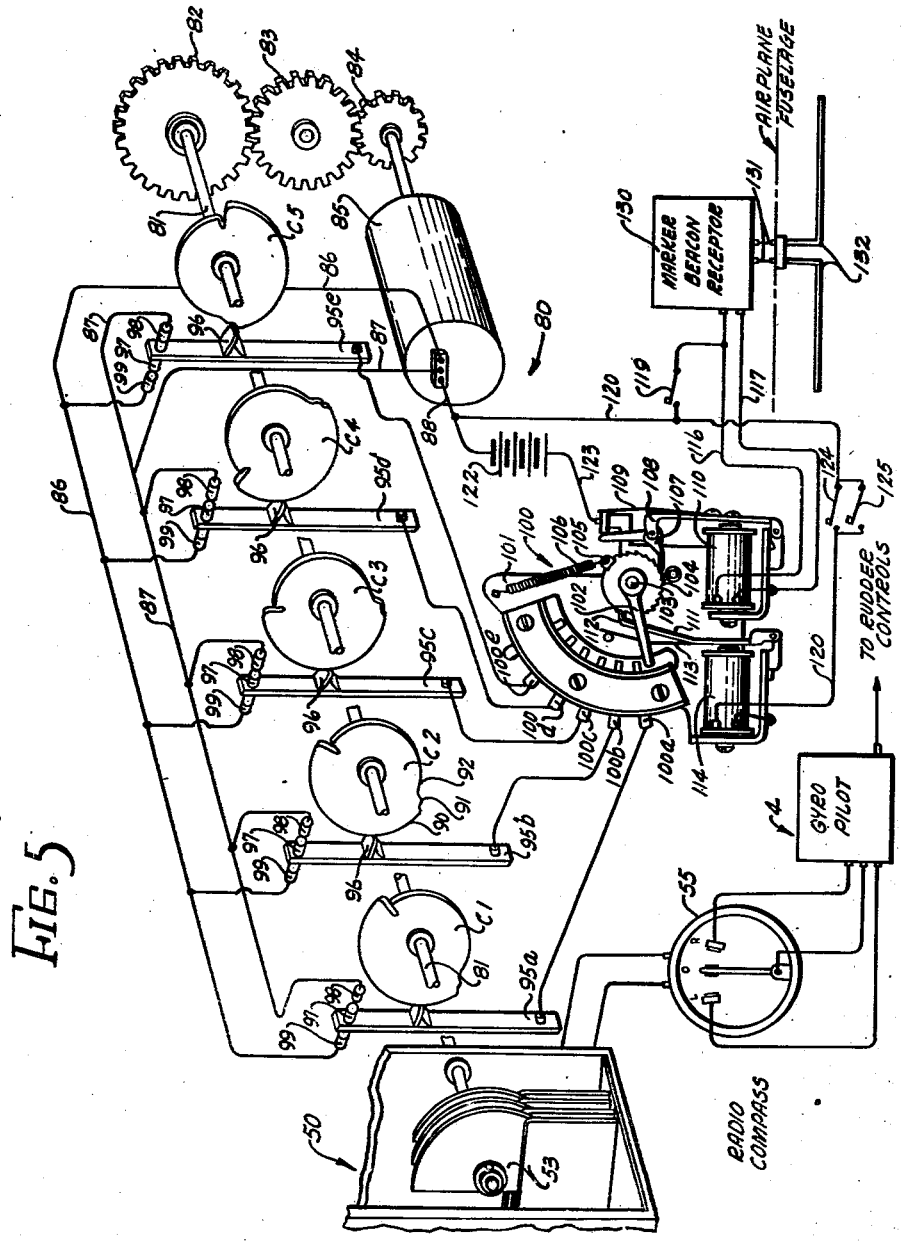

Patented Aug. 26, 1941

2,253,508

UNITED STATES PATENT OFFICE 2,253,508

NAVIGATION SYSTEM FOR GUIDING AIRCRAFT

Carl J. Crane, United States Army, Shreveport, La., and Constantin D. Barbulesco, Yellow Springs, Ohio Application December 2, 1940, Serial No. 368,214

14 Claims. (Cl. 250—2)

(Granted under the act of March 3, 1883, as amended April 30, 1928; 370 O. G. 757)

The invention described herein may be manufactured and used by or for the Government for governmental purposes, without the payment to us of any royalty thereon.

This invention relates to an automatic means for tuning the radio receiver of an aircraft radio compass to any one of a plurality of radio stations in response to the signal transmitted to aircraft from a marker beacon transmitter located on the ground, the radio compass being effective to directionally control the aircraft so as to direct the flight of the aircraft towards the selected radio station.

The combination of the automatic radio-compass-tuning device with the directional control of the aircraft furnishes a means for dispatching an aircraft from one radio compass station to another along a predetermined course by employing a marker beacon transmitter adjacent each radio compass station to cause the automatic frequency selector to cause the radio compass receiver to respond to the radiant energy transmitted by the next radio compass station in the direction of flight. The device in accordance with the invention is of general application, but it is particularly of great utility when employed in a blind landing system to directionally align the aircraft with the axis of the landing runway and to maintain such alignment during the course of the approach and descent to the point of landing. When the automatic control device is employed in a blind landing system, a plurality of radio compass stations are arranged in spaced alignment with the axis of the landing runway and a marker beacon transmitter also is located at each radio station point. By these means the aircraft may be directionally guided from one station to another until contact is made with the ground.

The principal object of the invention is the provision of an automatic directional control system for an aircraft, comprising a radio-signal-responsive device operative to directionally control the aircraft to maintain the flight directed towards a radio station to which the radio-signal-responsive device is tuned and a means responsive to radiant energy signals transmitted from a point on the ground operable to tune the radio-signal-responsive device to the frequency of a certain predetermined radio station.

Another object of the invention is the provision, in combination with a radio compass, of means to automatically tune the radio compass receiver to a frequency corresponding to a preselected radio station in response to signals received from a marker beacon station on the ground.

A further object of the invention is the provision of an automatic directional control for an aircraft, comprising power means for steering said craft, a radio compass operative to control said power means to cause said aircraft to fly a predetermined course, a plurality of spaced radio compass stations located on said predetermined course, each differing in frequency, marker beacon transmitters located on the said predetermined course, and means on said aircraft responsive to the signals from said marker beacon transmitters operative to cause said radio compass to cooperate with said radio compass stations successively, to thereby maintain said aircraft on said predetermined course.

Another object of the invention is the provision, in combination with a radio receiver, of an automatic tuning means for said receiver, including a directional radio-signal-responsive device operative to tune said receiver to a predetermined radio reception frequency in response to a predetermined directional radio signal received thereby.

Other objects of the invention will appear by reference to the detailed description in the specification and the appended drawings, in which:

Fig. 1 is a diagrammatic illustration of the various elements of the automatic frequency selector installed on an aircraft;

Fig. 2 is a plan view illustrating the arrangement of radio compass and marker beacon transmitter stations employed for directionally guiding an aircraft equipped with the automatic directional control in accordance with the invention, along a path aligned with said stations;

Fig. 3 is a side elevation of the radio station arrangement illustrated in Fig. 2;

Fig. 4 is a view illustrating the manner in which the automatically tuned radio compass is employed to control the directional control unit of an automatic pilot, to thereby control the directional heading of the aircraft; and Fig. 5 is a view, partly in perspective, illustrating the construction of the automatic frequency selector and changer employed in the control system of Fig. 4.

Referring now to Fig. 1: The reference numeral 1 indicates a conventional airplane directionally controlled by means of the vertical rudder 2 which is actuated by means of cables 3 adapted to be automatically controlled by means of the directional control unit of an automatic pilot 4, which preferably is of the well-known Sperry type. The directional control of the automatic pilot is adapted to be automatically controlled by a radio compass, generally indicated by the reference numeral 50, which comprises the usual radio compass receiver, having connected therewith a nondirectional receiving antenna indicated by the reference numeral 51, and a directional loop antenna 52, which together cooperate with the receiver so that the receiver is adapted to control the automatic pilot through means to be more specifically hereinafter described, such that any departure of the aircraft from a heading directly towards a selected radio compass transmitting station causes the radio compass to exert a correcting control on the rudder 2 through the medium of the automatic pilot 4. The radio compass receiver 50 is adapted to be automatically tuned by means of an automatic frequency selector and changer, generally indicated by the reference numeral 80. The automatic frequency selector and changer 80 is, in turn, controlled by the output of a conventional marker beacon receiver 130 having a conventional doublet antenna 132 connected therewith, and mounted beneath the airplane. The operation of the directional control system is such that upon the marker beacon receiver's being energized by radiant energy vertically transmitted by a marker beacon transmitter located on the ground, the output of the receiver is effective to operate a selector mechanism and automatic tuning device in the unit 80 to change the receiving frequency of the radio compass receiver and thus automatically alter the course of the airplane so as to direct the flight towards the newly selected station. By having marker beacon transmitter stations located adjacent each of a plurality of radio compass transmitting stations arranged along a predetermined course, it is possible to directionally control the aircraft to maintain the said predetermined course, since the marker beacon receiver and frequency changer are operative to successively tune the radio compass to the next succeeding radio compass transmitter station along the predetermined course as the aircraft flies over the respective stations in succession. In a radio navigating system in accordance with the invention as now in use, each of the radio compass stations has its own particular transmission characteristics, such as a particular transmission frequency differing for each of the respective stations and preferably within the frequency band of 270 to 350 kilocycles, while each of the marker beacon transmitting stations transmits signals in a confined vertical field over each station, and each transmits on the same ultra-high frequency of 75 megacycles, or a wave length of 3.9 meters, so that the marker beacon receptor is responsive to the marker beacon signals transmitted from a particular marker beacon transmitter only when in the radiant energy field radiated by that particular station. By employing the same frequency for each of the marker beacon transmitters, it is not necessary to retune the marker beacon receptor for each transmitter station. It is, of course, to be understood that the respective marker beacon transmitters may modulate their respective signals at an audio frequency to give an aural identification signal in the manner known in the art, and that the respective radio compass and marker beacon transmitter frequencies above noted are cited as illustrative only and not by way of limitation. The terms "marker beacon transmitter" and "directional radio signal transmitter," hereinafter employed in the specification and/or claims, are intended to refer to any ground transmitting station adapted to vertically direct a confined radiant energy field above the station—that is, the field may extend upward to any desired altitude, but extends over a limited area adjacent the station.

The arrangement of radio compass stations may be such that the aircraft may be dispatched from one station to another over a long course— for example, a transcontinental flight. The possibility of directionally guiding an aircraft from one radio station to another finds, however, a particular utility in conjunction with an instrument landing system—for example, a modified form of the well-known Army Air Corps blind landing system disclosed in patent application Serial No. 287,310, filed July 29, 1939, for improvements in "Aircraft automatic take-off flight and landing," filed in the names of Carl J. Crane, George V. Holloman, Raymond K. Stout, and Constantin D. Barbulesco. Only the directional controlling features of such an instrument landing system, however, will be considered here. The arrangement of radio stations suitable for directionally controlling an aircraft in azimuth during the approach and glide towards an air port along the axis of a landing runway, is best illustrated in Figs. 2 and 3.

Referring now to Figs. 2 and 3: The air port at which it is desired to make an instrument landing is indicated by the reference character A, and a number of radio stations are aligned in spaced relation along the axis of the selected landing runway. In practice, these radio stations are mounted on trucks so that the alignment of the station may be shifted to agree with a change in the wind direction. Each of the radio station points is indicated by reference characters—station 1, station 2, etc., to station 5, inclusive. At each of the radio station points there is provided a nondirectional radio transmitter indicated by the reference characters $T_1$, $T_2$, $T_3$—$T_5$ for each respective station and each station transmits at a different frequency, preferably within the frequency band previously noted. Similarly, at each radio station point there is provided a conventional marker beacon transmitter indicated by the reference characters $M_1$, $M_2$—$M_4$ for each corresponding station, respectively, with the exception of station 5. The marker beacon transmitters vertically radiate radiant energy in a fan-shaped beam in the manner indicated by the radiation patterns $R_1$, $R_2$—$R_4$, inclusive, all of the marker beacon transmitters being arranged to transmit energy at the same frequency of, for example, the ultra-high frequency of 75 megacycles previously noted. A radio range station is generally provided adjacent the larger airports, and such a radio range station is indicated by the reference character B in Fig. 2 and is provided with a conventional marker beacon $M_0$ located within the cone-of-silence zone. The radio stations 1 to 4, inclusive, are spaced apart at suitable intervals along the axis of the landing runway such that station 1 is located at a distance of approximately fifteen miles from the air port A, while station 4 is located at a distance of about fifteen hundred feet from the edge of the landing runway, station 5 being located along the axis of the landing runway beyond the point of landing, the latter station serving to guide the aircraft during the final stage of its descent.

The directional control of the aircraft during an instrument landing employing the automatic directional control in accordance with the invention, is as follows: The aircraft 1 approaches the radio range station B as illustrated in Fig. 2, at which time the pilot, by means of a master switch (not shown), may energize the automatic directional control system, thus rendering the marker beacon receiver 130 and the frequency selector and charger 80 (Fig. 1) operative to control the radio compass 50. In passing through the plane of the vertical radiation of the marker beacon $M_0$, the automatic frequency selector becomes operative, due to a signal received from the marker beacon receiver 130, to automatically tune the receiver of the radio compass to the frequency of the nondirectional radio compass transmitter $T_1$ at station 1, thus causing the aircraft to be directionally guided along the path indicated, towards station 1, and upon arrival at station 1 the marker beacon receiver 130 again becomes operative in response to the radiant energy received from the marker beacon transmitter $M_1$ at station 1, to cause the frequency selector and changer 80 to tune the radio compass to the frequency of the nondirectional radio compass transmitter station $T_2$ located at station 2. The aircraft will now be aligned with the axis of the landing runway, and the pilot may set the directional gyro of the automatic pilot toward station 2. The marker beacon receiver 130 is operative to control the frequency selector and changer 80 to cause the radio compass to be tuned to the next succeeding station along the predetermined course in a similar manner. The flight from station 1 to station 3 is carried out at a preselected altitude of—or example—one thousand feet, which altitude may be maintained by automatic means such as disclosed in the aforementioned application No. 287,310, or the pilot may manually control the aircraft to maintain the desired altitude. Upon reaching station 3, a descent is made at a constant rate such that when arriving at station 4 the altitude of the aircraft will be approximately two hundred feet. The descent from station 4 until contact is made with the ground is conducted at a constant rate of descent of about four hundred feet a minute, which is obtained by maintaining the aircraft in the level flight position, either manually or automatically, and closing the engine throttle to a position corresponding to the power glide condition for the particular aircraft in question. The aircraft is directionally guided during the last stage of the descent from station 4 to the ground by signals transmitted from the radio compass station $T_5$ at station 5. Upon contact with the ground, a landing-gear-actuated switch is operative, among other things, to cause a resetting operation of the selector mechanism in the frequency selector and changer device 80, which will later be described in more detail.

The aircraft during its descent may employ the conventional glide path beam such as used in the well-known Bureau of Standards blind landing system, or other types of glide path beams may be employed to either visually indicate the attitude of the aircraft in the vertical plane or, through suitable automatic mechanism, to actually control the aircraft during the course of its descent.

Referring now to Fig. 4, which discloses the elements of the automatic directional control system in accordance with the invention, and indicates the directional control unit of a type forming a part of the well-known Sperry automatic pilot: The automatic pilot 4 includes a casing 5 having mounted therein an air-driven gyro wheel 6 pivotally and rotatably mounted by means of the gimbal rings 7 and 8 so that the gyro, when caged and set for a particular heading, will maintain itself directionally fixed in space in a manner well known in the art. The vertical gimbal ring 8 has mounted on an extension thereof a pick-off valve member 9 having valve edges 10 and 11 which are adapted to cooperate with ports 12 and 13 in a valve element 14 which is rotatable with the casing 5 and the aircraft associated therewith. The valve element 14 is rigidly secured to a shaft 15 which is adapted to be rotated through a conventional differential gear mechanism 16, either by means of the gear 17, which meshes with a worm 18 rotated by a shaft 19 and pulley 20 through follow-up cable 21, or by means of shaft 22, which in turn may be rotated through gears 23 and 24 and shaft 25 from the reduction gear drive 26 associated with a reversible electric motor 27, which is preferably of the shunt-wound direct-current type having the field coil 28 and armature 29. The ports 12 and 13 of the pick-off valve member 14 are connected by means of flexible conduits 32 and 34, respectively, to conduits 33 and 35, respectively, which in turn are connected to opposite sides of a double-acting diaphragm-type servomotor 37 having a central diaphragm 36 mounted therein and adapted to shift a control rod 38 to actuate a pilot valve (not shown) in the valve casing 40 in either direction from a neutral position to thereby admit fluid pressure to either of conduits 42 or 43 to thereby actuate the piston of a servo-motor 44 in either direction. The servomotor 44 has its piston rod connected to the control cables 3 which are operative to actuate the vertical rudder 2 as previously described. The motion of the servomotor piston is transmitted through the follow-up cables 21 to the pulley 20 to cause a displacement of the pick-off valve member 14 to restore the valve to a balanced position relative to the pick-off valve member 9 in the manner well known in the art, to thus cause a displacement of the rudder proportional to the deviation of the aircraft from the gyro base line determined by the setting of the gyro 6. The casing 5 is continuously evacuated by means of a suitable pump (not shown) so that, as well as furnishing a sufficient pressure differential for operation of the gyro 6, it also causes a reduced pressure in the ports 12 and 13 and conduits 32 and 34; and the other conduits 33 and 35 cause a reduced pressure in the chambers of the servomotor 37 on opposite sides of diaphragm 36. When the pick-off valve member 14 is in a position such that ports 12 and 13 are equally lapped by the valve edges 10 and 11 of the pick-off valve member 9, equal suctions, or reduced pressures, will be produced on opposite sides of the diaphragm 36 of the servomotor 37, and air under atmospheric pressure admitted to the chambers of the servomotor 37 through small air bleeds will create a balanced pressure on opposite sides of the diaphragm, the control rod 38 thus remaining stationary, and the pilot valve in the valve casing 40 will then be in its neutral position.

If, however, the aircraft changes its heading in azimuth, the casing 5 will rotate relative to the gyro 6, causing relative rotation between the pick-off valve member 9 and the valve member 14, thus causing the valve edges 10 and 11 to lap the valve ports 12 and 13 an unequal amount, thus causing a difference in the suction pressure within the conduits 33 and 35, and thus causing an unbalance of the pressure acting on opposite sides of the diaphragm 36 of the servomotor 37. Due to this unbalance of pressures, the valve rod 38 will displace the pilot valve in the valve unit 40 an amount proportional to the existing differences in pressures and cause a corresponding displacement of the piston in the servomotor 44. The servomotor 44 will displace the rudder 2 in a direction such as to restore the aircraft to its initial predetermined heading and will simultaneously, through the follow-up cables 21, differential gear 16, and shaft 15, rotate the valve element 14 in a direction such that the ports 12 and 13 will again be lapped by the pick-off valve edges 10 and 11 an equal amount. This, in turn, will cause a cancellation of the control effect of the servomotor 37, which will restore the pilot valve in the valve unit 40 to its neutral position, thus cutting off the supply of pressure fluid to the servomotor 44 and leaving the servomotor in its advanced position and the rudder 2 displaced an amount proportional to the deviation of the aircraft from its predetermined heading. As the aircraft is restored towards its predetermined heading, the rudder is restored towards the neutral position and the operation of the device is such that when the aircraft is returned to its initial predetermined heading, the rudder will again be in the neutral position, at which time the pick-off valve members will again be in the proper relation with respect to each other so as to again produce an equal suction pressure in conduits 33 and 35. The above-described structure of the automatic pilot and the operation thereof is old and well known in the art and need not be further described.

The means for controlling the automatic pilot through the medium of the radio compass will now be described. As seen in Fig. 4, the radio compass receiver 50 has connected therewith the usual non-directional antenna 51 and the directional loop antenna 52, as previously noted with reference to Fig. 1, which cooperate with the receiver to cause the output of the receiver to affect an indicator 55 electrically connected by means of the conductors 54 to the output of the radio compass receiver 50, as is well known in the art. The deviation of the aircraft 1 (Fig. 1) from a heading towards the radio transmitting station to which the receiver 50 is tuned, will cause the pointer 56 of the left-right indicator 55 to deflect to the right or left, depending upon the direction of the change in heading of the aircraft. The pointer 56 is provided with a double contact 57 which is adapted to engage either of a pair of spaced contacts 58 and 59 suitably adjustably mounted on the dial face of the radio compass indicator 55. The double contact 57 is electrically connected to a conductor 60 which has a battery 59 connected in series therewith, and the other end of the conductor 60 is connected in common to one of the terminals of each of a pair of solenoids 61 and 63, respectively, the remaining terminals of which are respectively connected by means of conductors 62 and 64 to the respective contacts 58 and 59. The solenoid coils 61 and 63 are arranged in spaced relation on opposite sides of a pivoted relay arm 65, which is normally biased by light tension springs to maintain a neutral position midway between the coils of the solenoids. The relay arm 65 carries a pair of contact blades 66 and 67 at its outer end, which are suitably insulated from each other. The contact 66 and 67 are respectively connected to the terminals of a battery 70 by means of conductors 68 and 69, which conductors are also connected to the terminals of the field winding 28 of the electric motor 27. In one extreme position of the movement of the relay arm 65, the contact blades 66 and 67 are respectively adapted to engage a pair of contacts 71 and 72 and, in the other extreme position of movement, to engage contacts 71 and 73. The contacts 72 and 73 are interconnected to a conductor 74, and contact 71 is connected to a conductor 75, the conductors 74 and 75 being electrically connected to armature 29 of the electric motor 27. The relay arm 65, with its associated contact blades 66 and 67 and contacts 71, 72, and 73, forms a means for reversing the direction of flow of current through the armature circuit of the shunt-wound motor 27, and thus causing the motor to rotate in either the forward or reverse direction.

Upon the deflection of the pointer 56 from the central or "on course," position in response to a deviation of the aircraft to the right or left from a course directed towards a selected radio compass transmitting station, contact 57 will engage either of contacts 58 or 59 to energize either of solenoid coils 61 and 63, to thereby cause a displacement of the relay arm 65 in either direction from its neutral position, which in turn will connect the armature circuit of the motor 27 in parallel with the battery 70 to thereby cause the motor 27 to operate in the forward or reverse direction. Rotation of the armature of the motor 27 will, through reduction gear unit 26, cause the shaft 25, gears 24 and 23 and shaft 22 to be rotated in a direction corresponding to the direction of rotation of motor 27, which in turn is governed by the direction of the deviation of the pointer 56 of indicator 55. Rotation of the shaft 22 through the differential gear unit 16 causes a displacement of the vlave member 14 relative to the pick-off valve member 9, which in turn causes operation of the pilot-valve-controlling servomotor 37 and rudder-actuating servomotor 44 of the automatic pilot in a manner previously described. Operation of the servomotor 44 will cause a displacement of the rudder 2 to again bring the heading of the aircraft towards the selected radio compass station, and, upon the aircraft's attaining such a heading, the pointer 56 will again move to its central position, breaking the electrical circuit with either of contacts 58 or 59 to thereby de-energize the motor 27. It is thus seen that the radio compass, through the operation of a conventional radio compass indicator, becomes operative through the medium of an automatic pilot to maintain the heading of the aircraft directed towards a desired radio compass station. In actual flight a pilot sets the directional gyro 6 of the automatic pilot 4 to correspond to the heading of the selected radio compass station, and the radio compass indicator then becomes operative to apply a secondary control through the gyro pilot to maintain the aircraft on its predetermined heading. When employed for the purpose of directionally controlling an aircraft during the course of an instrument landing, it is necessary to set the directional gyro only once in the course of the flight over successive aligned radio compass stations. It is to be understood, however, that the radio compass control will override the gyro control, irrespective of what its instant setting may happen to be.

Further, other types of sensitive relays for controlling the reversible motor 27, actuated by the right-left indicator 55 through—for example—a photoelectric device, may be employed to replace the contact mechanism shown.

As previously described with reference to Fig. 1, the radio compass receiver 50 is adapted to be sequentially tuned to the frequency of respective selected radio compass stations by means of an automatic frequency selector and changer 80, which in turn is controlled in accordance with the output of the marker beacon receiver 130, which receives radiant energy radiated from marker beacon transmitting stations on the ground by means of leads 131 connected to the directional antenna 132 mounted on the aircraft, as noted in Fig. 1.

The specific construction of the automatic frequency selector and changer 80 will now be described.

Referring now to Fig. 5, the automatic frequency selector, generally indicated by the reference character 80, comprises a shaft 81 which is adapted to be connected, either directly or by means of a flexible shaft, to actuate the rotatable elements of a tuning condenser, or other tuning device, 53 of the radio compass receiver 50. The shaft 81 at its outer end is provided with a gear 82 which is adapted to be rotated in either direction by gears 83 and 84 from a reversible electric motor 85, which is preferably of the split-field series type, having field terminals 86 and 87 and an armature terminal 88. The shaft 81 is provided with a plurality of spaced cams $C_1$, $C_2$, $C_3$, $C_4$, and $C_5$, respectively, which are frictionally mounted thereon for rotation in either direction therewith, and the frictional mounting of the cams is such that the cams may be set in any desired angular relation with respect to the shaft 81. Each cam is provided with a raised arcuate section 90 and a depressed arcuate portion 92 of lesser radial dimensions, the two arcuate sections being connected to form a neutral section 91 intermediate the raised and the depressed cam portions. Associated with each cam is a flexible contact member $95a$, $95b$, $95c$, $95d$, or $95e$, respectively, and each of the flexible contact members is provided with a cam follower 96 adapted to engage its respective associated cam. At the upper end of each of the flexible contact members $95a$, $95b$, etc., there is provided a double electrical contact 97 which is adapted to engage either of a pair of electric contacts 98 or 99 arranged on opposite sides of the double contact 97 and in spaced relation therewith. All of the respective contacts 98 are connected in parallel to the conductor 87, which in turn connects to one of the split-field terminals of the electric motor 85, and in a similar manner all of the contacts 99 are connected in parallel to the conductor 86, which connects to the other split-field terminal of the electric motor 85. Each of the flexible contact members $95a$, $95b$, etc., is respectively connected to a corresponding contact strip $100a$, $100b$, $100c$, $100d$, and $100e$ of a selector switching mechanism, generally indicated by the reference numeral 100, which itself is a commercially available device employed in automatic telephone switches. The switching device 100 includes a frame member 101 having rotatably mounted thereon a switch contact arm 102 rotatably mounted on a shaft 103 supported by the frame 101. The switch blade 102 is secured to a toothed ratchet wheel 104 to be rotated thereby, the teeth of the ratchet wheel being adapted to be engaged by a pivoted, yieldingly mounted, advancing pawl 107 pivotally supported on the upper end of an armature 108 and yieldingly moved out of engagement with the ratchet wheel 104 by means of a flat spring 109. The ratchet wheel 104 is also provided with an integral lever extension 105 which is connected to one end of a coil tension spring 106, the other end of the spring being anchored to the frame 101. The armature 108 is adapted to be attracted by a solenoid coil 110 which, when energized, causes the armature to be deflected towards the left, as seen in Fig. 5, and causes the ratchet wheel 104 to be advanced an amount sufficient to cause the switch contact arm 102 to be advanced from a position in alignment with one of the contact strips $100a$, etc., into alignment and engagement with the next succeeding contact strip, such as $100b$, etc. As the ratchet wheel 104 and switch arm 102 are advanced by the pawl 107, a locking detent 112 formed on a pivotally mounted arm 111 is caused to lock the ratchet wheel in its advanced position due to the force exerted on the detent 112 by the spring 113. The pivoted arm 111 is adapted to be retracted against the force of spring 113 by means of the solenoid coil 114, so that the detent portion 112 will be moved out of the path of the teeth of the ratchet wheel 104, which will allow the spring 106 to rotate the ratchet wheel and switch arm to an initial predetermined position. The solenoid coil 110 has one of its terminals connected by means of a conductor 116 to one of the output terminals of the marker beacon receptor 130 and has its other terminal grounded to the frame 101 and also connected by means of the conductor 117 to the other output terminal of the marker beacon receptor 130. The solenoid coil 114 has one of its terminals grounded to the frame 101 and has its remaining terminal connected by means of a conductor 120 to the positive terminal of a battery 122. The battery 122 also has its positive terminal connected to the armature conductor 88 of the motor 85 and has its negative terminal grounded to the frame 101 of the switching device 100. The conductor 120 is also connected by means of a manually actuated switch 119 to the conductor 116; and the conductor 120 further has inserted in series therewith a pair of parallelly connected switches 124 and 125, respectively, the switches 124 and 125 being located beyond the connection with the switch 119. The switch 124 is adapted to be manually actuated by the pilot, while the switch 125 is adapted to be actuated by the landing gear of the aircraft 1 (Fig. 1) when the aircraft contacts the ground in making a landing.

The operation of the device is as follows: The cams $C_1$, $C_2$, $C_3$, etc., are each set in a position corresponding to a predetermined position of the tuning condenser, or other tuning element, 53 of the radio compass receiver 50, such that in each respective position, the radio compass receiver will be tuned to the frequency of a predetermined radio compass transmitting station. When the shaft 81 is in a position corresponding to one desired setting of the tuning element of the radio compass receiver, the neutral section 91 of a respective cam will then be in contact with the associated cam follower 96 so as to maintain the associated spring contact member $95a$, etc., in a position such that the double contact 97 associated therewith will be in a mid position out of engagement with either of the contacts 98 or 99. With one cam in the neutral position, all the other cams will be in a position such that the contact 97 will engage either its associated contact 98 or 99. If, then, the switch arm 102 is advanced to engage a particular contact strip 100a of the switching device 100, current will then flow to the corresponding connected contact strip 95a, causing current to flow through the contact strip to the double contact 97 and through either contact 98 or 99 and the motor field conductors 86 or 87 to the motor 85 and through the armature conductor 88 to the positive terminal of the battery 122. The motor will then be energized to rotate in a direction such that the shaft 81 and—for example—the cam C₁ will be rotated in a clockwise direction, as seen in Fig. 5, until the neutral section 91 of the cam C₁ is engaged by the cam follower 96 associated with the contact strip 95a, at which time the flow of current to the motor 85 will cease and shaft 81 will be stopped in the desired position. Similarly, whenever the switch arm 102 of the selector switch 100 is advanced to engage any of contacts 100b, 100c, etc., the motor 85 will be energized to rotate in a direction and an amount such that the shaft 81 will be rotated to bring the neutral point of the cam associated with the respective switch contact strip 100b, etc., to its neutral position and stop the motor 85 and shaft 81 in a position corresponding to the desired frequency associated with that respective cam. It is thus seen that if the solenoid coil 110 is successively energized, the switch arm 102 will successively tune the radio compass to a definite frequency corresponding to the angular setting of each respective cam C₁, C₂, etc., and thus tune the radio to cooperate successively with predetermined radio compass transmitting stations. The number of preselected tuning positions is limited only by the number of cams employed. This automatic electric servomotor for tuning a radio receiver is per se known in the art.

As the aircraft passes over a marker beacon station, the signal received thereby will cause the solenoid coil 110 to be energized and advance the switch arm 102 into position to select another radio compass station frequency, the first received impulse moving the switch arm 102 from an initial position into engagement with the contact strip 100a and successive impulses moving the switch arm 102 to the successive positions in engagement with contact strips 100b, 100c, etc., thus controlling the radio compass in the manner previously described with reference to Figs. 1 to 4, inclusive. Since it is desirable to let the pilot arbitrarily, under certain conditions, select the station towards which he wants to fly, it is then necessary only that the pilot close the switch 119 to thereby energize the solenoid coil 110 independently of the marker beacon receiver 130, and by closing the switch a number of times the switch arm 102 may be advanced to its successive positions. Similarly, it may be desirable to reset the switching mechanism to its initial position, and to do this it is necessary only to close the manual switch 124 to thereby energize the solenoid coil 114 to cause a resetting operation, as previously described, the switch 125 being employed only for causing the resetting operation after the aircraft has contacted the ground in a landing.

In the switch mechanism as illustrated in Fig. 5, there is disclosed only a single bank of contact strips 100a, 100b, etc., and a single switch arm 102 associated therewith. However, in the device as actually used, a plurality of switch contact arms and associated contact strips may be employed to simultaneously carry out other desired functions, such as the control of altitude and the engine throttle, and to light pilot lights simultaneously with the automatic tuning of the radio compass receiver from one predetermined frequency to another predetermined frequency. Such other control mechanism has not been illustrated, in order to simplify the disclosure.

In order to make an instrument landing in the manner as previously described with reference to Figs. 2 and 3, the pilot, in approaching the landing field, will pass over a marker beacon station located either at a radio range station or in some fixed and determined position by previous radio communication with the airplane at the site of the desired landing, the pilot closes a master switch (not shown) by which the automatic devices are energized, and in passing over the first marker beacon station— such as M₀ (Fig. 2)—the marker beacon receptor 130 will be energized to cause the solenoid coil 110 to advance the ratchet wheel 104 from its initial position into engagement with the contact strip 100a, thus causing the shaft 81 to rotate the tuning device 53 of the radio compass receiver into a position corresponding to the frequency of the first radio compass station T₁ (Fig. 2). The radio compass receiver, through indicator device 55 (Fig. 4) is thus rendered operative to directionally control the aircraft, to direct the flight towards station 1 (Figs. 2 and 3) in the manner previously described. When the aircraft arrives at station 1, the marker beacon transmitter M₁ will cause the marker beacon receptor to actuate the solenoid coil 110 and advance the switch arm 102 into engagement with the contact strip 100b, thereby causing the motor 85 to actuate shaft 81 to tune the radio compass receiver 50 to the frequency of the radio compass station T₂ at station 2, and the aircraft will automatically be aligned into a path corresponding to the axis of the landing runway. At this time the pilot may manually set the gyro 6 of the automatic pilot 4 (Fig. 4) to the corresponding azimuth heading of the axis of the landing runway. After passing over station 2, the marker beacon transmitter M₂ causes the radio compass to automatically be tuned to the frequency of the radio compass receiver T₃ at station 3, and flight from one station to another is automatically maintained by the directional control device previously described with reference to Fig. 4. During the approach to the landing runway, the altitude may be controlled either manually or automatically, as previously noted. Upon contact with the ground, the switch 125 causes the solenoid coil 114 to be actuated to reset the switch arm 102 into its initial position, and the above cycle may be repeated.

It is to be noted that the radio compass tuning system and automatic directional control herein disclosed is equally well adapted to control the aircraft during take-off by maintaining the aircraft directionally aligned with a predetermined course passing through one or more radio compass transmitter stations and, of course, can be employed also for dispatching an aircraft from one radio compass station to another in long cross-country flights, relieving the pilot of a substantial part of the burden in operating large aircraft.

While the above-described system has been illustrated as applied to effect the directional control of an aircraft automatically, it is obvious that it may be employed only for the purpose of tuning a radio compass to any one or more predetermined radio compass stations and thereby controlling the conventional radio compass indicator, leaving the pilot to directionally control the aircraft in accordance with the indications of the aforesaid indicator.

While the device illustrated in the drawings has been shown as applied to a conventional type of radio compass, it is evident that a radio receiver operative to actuate a left-right indicator in response to the signals received from a directed beam, such as—for example—the conventional radio range signal, may be tuned to the frequency of a succeeding radio range station in a similar manner to that disclosed, employed for the purpose of tuning the receiver of a radio compass. Further, it is obvious that the device in accordance with the invention may be employed to directionally guide the aircraft along a radio range beacon in exactly the same manner as employed in conjunction with the conventional radio compass described above.

While only one modification has been disclosed in the drawings, other modifications and alterations will become apparent to those skilled in the art, as falling within the scope of the invention as defined in the appended claims.

We claim:

1. In combination, a radio compass adapted to indicate the heading of an aircraft relative to a selected nondirectional radio transmitting station, power means for tuning said radio compass to the frequency of any one of a plurality of said radio transmitting stations spaced along a predetermined course, a plurality of directional radio transmitting stations located along said predetermined course and each operative to radiate energy in a vertically directed confined field, and radio-signal-responsive means responsive, when in the field radiated by any one of said directional transmitting stations, to signals transmitted from said one directional station for actuating said tuning means to tune said radio compass to the frequency of a certain one of said nondirectional radio transmitting stations.

2. The structure as claimed in claim 1, including means for manually controlling said power means irrespective of said radio-signal-responsive means.

3. In combination, a radio compass adapted to indicate the heading of an aircraft relative to a selected nondirectional radio transmitting station, power means for tuning said radio compass to the frequency of any one of a plurality of said nondirectional radio transmitting stations, said stations respectively differing in frequency and spaced along a predetermined course, a plurality of directional radio stations located along said predetermined course and each associated in close proximity with a respective one of said nondirectional stations and operative to radiate energy in a vertically directed confined field, and radio-signal-responsive means responsive, when in the field radiated by any one of said directional transmitting stations, to signals transmitted from said one directional station, to control said power means to tune said radio compass to the frequency of the next succeeding non-directional transmitting station along said predetermined course.

4. An automatic directional control system for an aircraft, comprising, in combination, an automatic pilot operative to maintain the heading of said aircraft on a predetermined course, a radio compass on said aircraft operatively connected to said automatic pilot to control the heading of said aircraft with respect to a selected radio station, a plurality of radio compass transmitting stations on the ground respectively differing in transmission frequency, a marker beacon transmitter station associated with one of said radio compass stations, tuning means for said radio compass, and radiant-energy-responsive means responsive to the energy vertically radiated by said marker beacon transmitter station when in the field thereof and operatively connected to said tuning means to cause said radio compass to be tuned from the frequency of said radio compass station associated with said marker beacon station to the frequency of another of said radio compass stations, whereby said aircraft is directionally guided towards said last-named radio compass station.

5. An automatic directional control system for aircraft, comprising, in combination, a power-actuated means for steering said aircraft, a radio compass mounted on said aircraft and operatively connected to said power means to control the same to direct the flight of said aircraft along a course passing through a selected radio station point, a nondirectional radio transmitting station on the ground, a directional radio transmitting station on the ground operative to transmit radiant energy in a confined vertical field, and radiant-energy-responsive means on said aircraft responsive to the radiant energy received when in said vertical radiant energy field and operatively connected to said radio compass to cause said radio compass to respond to radiant energy transmitted by said nondirectional radio transmitting station.

6. A directional control system for aircraft, comprising, in combination, a power-actuated directional guiding means for said aircraft, a radio compass mounted on said aircraft and operatively connected to said power means to control the same to direct said aircraft flight along a course passing through a selected radio station point, a plurality of nondirectional radio transmitter stations differing in frequency, spaced along a predetermined course, a plurality of directional radio transmitting stations located at predetermined points along said predetermined course and radiating energy in confined vertical planes, radiant-energy-responsive means responsive to radiant energy received from any one of said directional radio transmitting stations, and means controlled by said radiant-energy-responsive means and operatively connected to said radio compass to cause said radio compass to selectively respond to the radiant energy transmitted by said nondirectional radio transmitting stations as said aircraft passes through the field of radiation of each successive one of said directional radio transmitting stations along said predetermined path.

7. The structure as claimed in claim 6, including means for manually controlling said radio compass to select any one of said nondirectional radio transmitting stations to which said radio compass is to cooperate in directionally controlling said aircraft.

8. In a navigating device for an aircraft, power-actuated directional control means for said aircraft, a radio compass operatively connected to said power-actuated control means and operative to maintain the course of said aircraft directed towards or away from a selected radio compass transmitting station, selector means for said radio compass operative to cause said radio compass to be responsive to the radiant energy transmitted by any one of a plurality of predetermined radio compass transmitter stations, a marker beacon transmitter station at a predetermined point on the ground operative to radiate energy in a confined vertical field, a marker beacon receptor carried by said aircraft, and means controlled by said marker beacon receptor for actuating said selector means to a particular selecting position in response to the energizing of said marker beacon receptor when in the said radiant energy field transmitted by said marker beacon transmitter station.

9. A directional guiding system for guiding an aircraft along a predetermined course during the course of an instrument landing, comprising, in combination, a radio compass including selector means operable to cause said radio compass to respond to radiant energy transmitted by a particular nondirectional radio transmitter station; directional control means on said aircraft for maintaining a desired heading thereof; means actuated by said radio compass and operatively connected to said control means to correct the heading of said aircraft for deviations from a course passing through said radio station transmitter point; a plurality of radio compass transmitter stations arranged in spaced alignment on the ground along the axis of a landing runway; a plurality of marker beacon transmitter stations arranged in spaced relation on the ground along the axis of said landing runway each operative to transmit energy in a confined vertical field, certain of said marker beacon transmitter stations being located in coincidence with said certain of said radio compass transmitter stations; marker-beacon-signal-responsive means on said aircraft energized when in any one of said vertical fields; and means controlled by said marker-beacon-signal-responsive means and operatively connected to said radio compass selector means, whereby when said aircraft flies over successive marker beacon transmitter stations, said selector means will be actuated to cause said radio compass to be responsive successively to the radiant energy transmitted by successive ones of said radio compass transmitter stations, thereby causing said aircraft to be guided automatically from one station to another.

10. The structure as claimed in claim 9, in which said aircraft is provided with means actuated, on contact of the aircraft with the landing runway, for resetting said selector means to a predetermined initial position.

11. The structure as claimed in claim 9, in which there is provided a manually controlled means for actuating said selector means, and other manually controlled means for resetting said selector means to an initial predetermined position.

12. An automatically controlled radio compass for aircraft, including a mobile radio-signal receiver carried by the associated aircraft and having a selector means operative in each position thereof to cause said receiver to respond to radiant energy signals radiated from a predetermined nondirectional ground transmitter station, and a radiant-energy-signal-responsive device associated with and operatively connected to said selector means and responsive to energy received from a vertically directed, confined, radiant energy field transmitted from a directional transmitter on the ground only when in the said confined radiant energy field for causing said selector means to be actuated from one selecting position to another.

13. An automatically controlled radio directional indicator for aircraft, including a mobile radio signal receiver carried by the associated aircraft and having a selector means operative in each position thereof to cause said receiver to respond to radiant energy signals radiated from a predetermined ground transmitter station, and a radiant-energy-signal-responsive device operatively connected to said selector means and responsive to energy received from a vertically directed radiant energy field transmitted from another transmitter on the ground only when in the said confined radiant energy field for causing said selector means to be actuated from one selecting position to another.

14. The structure as claimed in claim 13, including manually controlled means for actuating said selector means.

CARL J. CRANE.
CONSTANTIN D. BARBULESCO.